US012798071B2

(12) United States Patent
Chuan

(10) Patent No.: US 12,798,071 B2
(45) Date of Patent: Nov. 17, 2026

(54) HYDRAULIC HAND TOOL

(71) Applicant: KUDOS MECHANICAL CO., LTD., New Taipei City (TW)

(72) Inventor: James Chuan, New Taipei City (TW)

(73) Assignee: KUDOS MECHANICAL CO., LTD., New Taipei City (TW)

( * ) Notice: Subject to any disclaimer, the term of this patent is extended or adjusted under 35 U.S.C. 154(b) by 218 days.

(21) Appl. No.: 18/810,475

(22) Filed: Aug. 20, 2024

(65) Prior Publication Data

US 2026/0001207 A1 Jan. 1, 2026

(30) Foreign Application Priority Data

Jun. 27, 2024 (TW) ................................ 113123987

(51) Int. Cl.
*B25F 5/00* (2006.01)

(52) U.S. Cl.
CPC .................................... *B25F 5/005* (2013.01)

(58) Field of Classification Search
CPC ....................................................... B25F 5/005
USPC ........................................ 173/218; 72/453.15
See application file for complete search history.

(56) References Cited

U.S. PATENT DOCUMENTS

| | | | | |
|---|---|---|---|---|
| 6,276,186 B1 * | 8/2001 | Frenken | B25F 5/005 29/751 |
| 6,446,482 B1 * | 9/2002 | Heskey | B25B 27/146 72/453.02 |
| 11,440,153 B2 * | 9/2022 | Rzasa | B23Q 17/2409 |
| 11,759,937 B1 * | 9/2023 | Chuan | B25F 5/005 91/287 |
| 2006/0272381 A1 * | 12/2006 | Ayer | B25B 27/10 72/453.16 |
| 2008/0282763 A1 * | 11/2008 | Chiasson | B25F 5/02 72/453.16 |

FOREIGN PATENT DOCUMENTS

| | | |
|---|---|---|
| DE | 102020112217 A1 | 5/2021 |
| DE | 102022131012 B3 | 2/2024 |
| DE | 102023122022 A1 | 2/2024 |
| JP | H11176553 A | 7/1999 |
| TW | 202409421 A | 3/2024 |
| TW | 202411535 A | 3/2024 |

* cited by examiner

*Primary Examiner* — Nathaniel C Chukwurah
(74) *Attorney, Agent, or Firm* — METIS IP LLC

(57) ABSTRACT

A hydraulic hand tool has a first oil-return channel, a second oil-return channel, and an oil-return-controlling mechanism. Hydraulic oil can carry out the oil-return process through the first oil-return channel and the second oil-return channel. The oil-return-controlling mechanism has a control channel, a blocking unit, an elastic unit, a driving assembly, and a control module. The control channel communicates with the first oil-return channel and the second oil-return channel. The blocking unit is mounted in the control channel. The elastic unit presses against the blocking unit to block the control channel and thus isolate the first oil-return channel and the second oil-return channel. The driving assembly is controlled by the control module. The driving assembly makes the blocking unit abut against the elastic unit and move, and thus the first oil-return channel and the second oil-return channel communicate with each other.

9 Claims, 9 Drawing Sheets

HYDRAULIC HAND TOOL

CROSS-REFERENCE TO RELATED APPLICATIONS

This application claims the priority benefit of TW application No. 113123987, filed on Jun. 27, 2024, the entirety of which is hereby incorporated by reference herein and made a part of specification.

TECHNICAL FIELD

The present invention relates to an oil-return mechanism, especially to an oil-return mechanism for a hydraulic hand tool.

BACKGROUND

A conventional hydraulic hand tool includes an oil-storage space, a driving assembly, and a piston assembly. The driving assembly draws out the hydraulic oil from the oil-storage space and pressurizes it into the piston assembly, thereby pushing the piston to clamp or squeeze objects.

When the piston moves to abut the object, the pressure inside the piston assembly will gradually increase as the object is gradually squeezed. When the pressure is greater than the set threshold, a safety valve of the hydraulic hand tool will be opened by the pressure and allow a small amount of the hydraulic oil to flow back into the oil-storage space, thereby maintaining a certain pressure value within the pressure inside the piston assembly.

To make a large amount of the hydraulic oil return back to the oil-storage space, a user needs to continuously press an oil discharge rod to allow the hydraulic oil to flow back into the oil-storage space from the piston assembly. However, the operation above not only causes inconvenience to the user, but also requires the user to control the return flow time, such that the amount of oil return cannot be fixed each time.

To overcome the shortcomings, the present invention provides a hydraulic hand tool to mitigate or obviate the aforementioned problems.

SUMMARY

The main objective of the present invention is to provide a hydraulic hand tool that is capable of fixing the amount of oil return for each oil-return process.

The hydraulic hand tool has a first oil-storage space, a piston assembly, a first oil-return channel, a second oil-return channel, and an oil-return-controlling mechanism.

The first oil-storage space is configured to contain hydraulic oil inside. The piston assembly is mounted apart from the first oil-storage space and has an oil-inlet channel and a second oil-storage space. The oil-inlet channel communicates with the first oil-storage space and the second oil-storage space communicates with the oil-inlet channel. The hydraulic oil can pass from the first oil-storage space into the second oil-storage space through the oil-inlet channel.

The first oil-return channel communicates with the second oil-storage space. The hydraulic oil can pass from the second oil-storage space into the first oil-return channel. The second oil-return channel communicates with the first oil-return channel and the first oil-storage space. The hydraulic oil can pass from the first oil-return channel into the first oil-storage space through the second oil-return channel.

The oil-return-controlling mechanism selectively communicates with or blocks the first oil-return channel and the second oil-return channel and has a control channel, a blocking unit, an elastic unit, a driving assembly, and a control module.

The control channel communicates with the first oil-return channel and the second oil-return channel. The blocking unit is mounted in the control channel and can selectively communicate with or block the first oil-return channel and the second oil-return channel. The elastic unit presses against the blocking unit and tends to make the blocking unit block the first oil-return channel and the second oil-return channel. The elastic unit tends to press the blocking unit toward the second oil-return channel. The driving assembly is connected to the blocking unit. The driving assembly can make the blocking unit resist the elastic unit such that the first oil-return channel and the second oil-return channel communicate with each other. The driving assembly comprises a motor and a linkage mechanism. The linkage mechanism comprises a first end and a second end. The first end is connected to the motor and the second end is connected to the blocking unit. The motor drives the linkage mechanism and makes the linkage mechanism drive the blocking unit to resist the elastic unit and away from the second oil-return channel, thereby the first oil-return channel and the second oil-return channel communicating with each other. The control module is signally connected to the driving assembly and can make the driving assembly resist the elastic unit in a preset time period.

Another hydraulic hand tool has a first oil-storage space, a piston assembly, a first oil-return channel, a second oil-return channel, and an oil-return-controlling mechanism. The first oil-storage space is configured to contain hydraulic oil inside. The piston assembly is mounted apart from the first oil-storage space and has an oil-inlet channel and a second oil-storage space. The oil-inlet channel communicates with the first oil-storage space and the second oil-storage space communicates with the oil-inlet channel. The hydraulic oil can pass from the first oil-storage space into the second oil-storage space through the oil-inlet channel. The first oil-return channel communicates with the second oil-storage space. The hydraulic oil can pass from the second oil-storage space into the first oil-return channel. The second oil-return channel communicates with the first oil-return channel and the first oil-storage space. The hydraulic oil can pass from the first oil-return channel into the first oil-storage space through the second oil-return channel. The oil-return-controlling mechanism selectively communicates with or blocks the first oil-return channel and the second oil-return channel and has a control channel, a blocking unit, an elastic unit, a driving assembly, and a control module. The control channel communicates with the first oil-return channel and the second oil-return channel. The blocking unit is mounted in the control channel and can selectively communicate with or block the first oil-return channel and the second oil-return channel. The elastic unit presses against the blocking unit and tends to make the blocking unit block the first oil-return channel and the second oil-return channel. The elastic unit tends to press the blocking unit toward the first oil-return channel. The driving assembly is connected to the blocking unit. The driving assembly can make the blocking unit resist the elastic unit such that the first oil-return channel and the second oil-return channel communicate with each other. The driving assembly comprises a motor and a linkage mechanism. The linkage mechanism comprises a first end and a second end. The first end is connected to the motor and the second end is connected to the blocking unit. The motor drives the linkage mechanism and makes the linkage mechanism drive the blocking unit to resist the elastic unit and away from the first oil-return channel, thereby the first oil-return channel and the second oil-return channel communicating with each other. The control module is signally connected to the driving assembly and can make the driving assembly resist the elastic unit in a preset time period.

The advantage of the present invention is that the startup and shutdown of the oil-return process are started through the control module settings and the driving assembly. The user only needs to press the oil-return button once and then start the control module. The driving assembly is controlled by the control module to perform the oil-return operation for a preset time. When the operation set by the user is completed, the control module controls the driving assembly to rotate the cam away from the linkage mechanism. Therefore, the blocking unit loses the force against the elastic unit, allowing the elastic unit to press against the blocking unit and move the blocking unit to block the first oil-return channel and the second oil-return channel. In other words, the user does not need to continuously manually control the oil-return process. The user only needs to set the control module in advance to easily operate the hydraulic hand tool and fix the amount of oil return for each oil-return process.

Other objectives, advantages and novel features of the invention will become more apparent from the following detailed description when taken in conjunction with the accompanying drawings.

DETAILED DESCRIPTION

Figure 1:
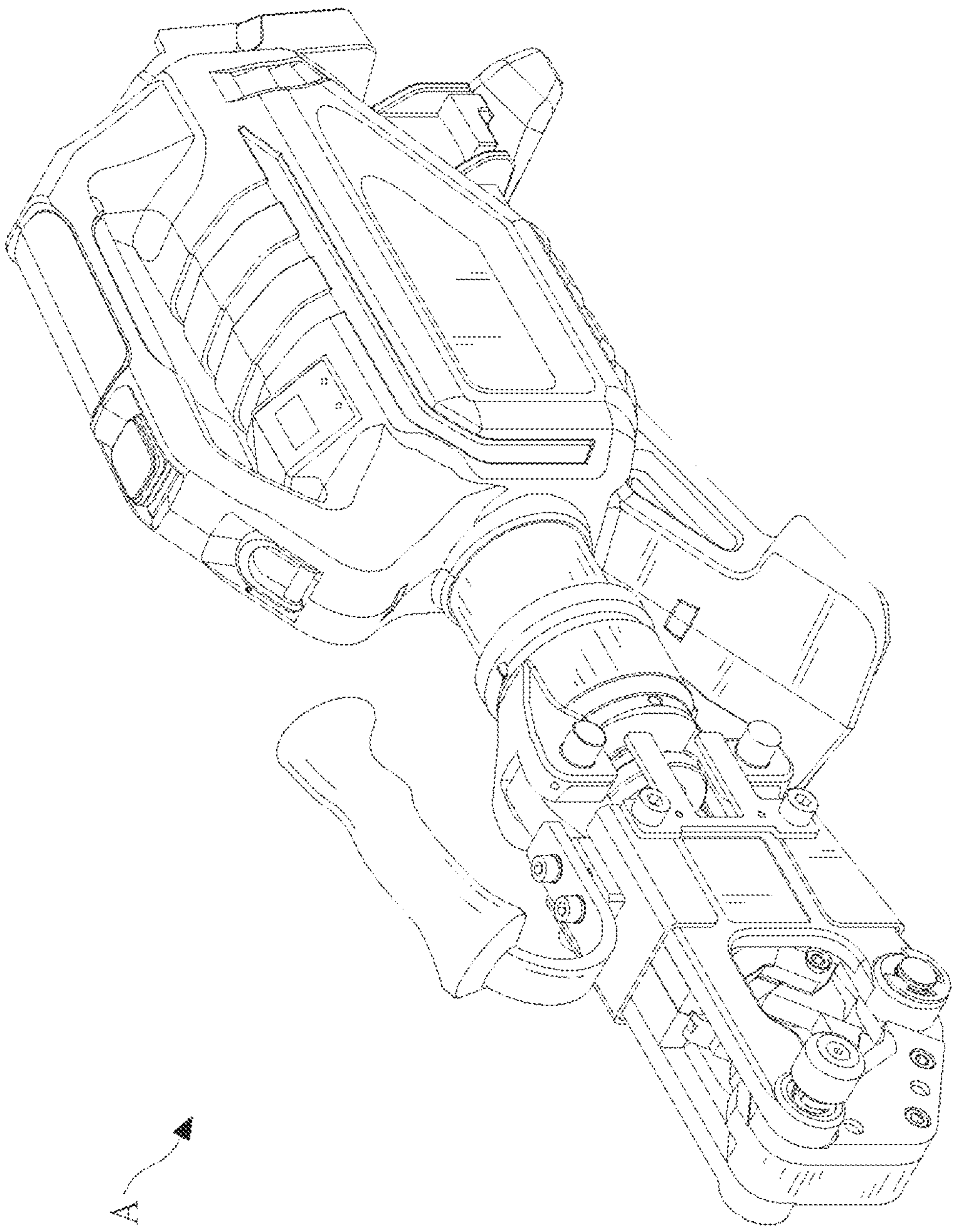
FIG. 1 is a perspective view of a hydraulic hand tool of the first embodiment in accordance with the present invention.
Figure 2:
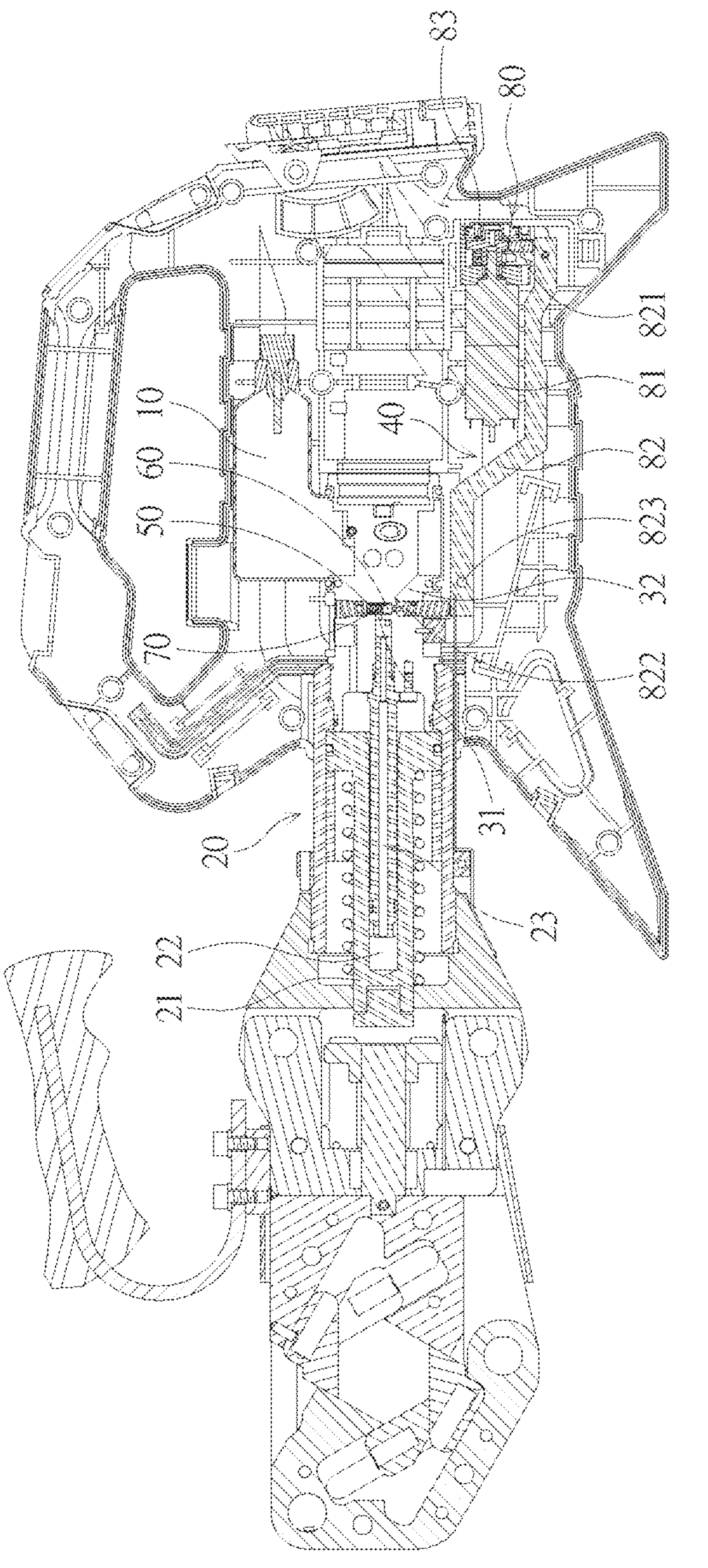
FIG. 2 is a sectional view of the hydraulic hand tool in FIG. 1.
Figure 3:
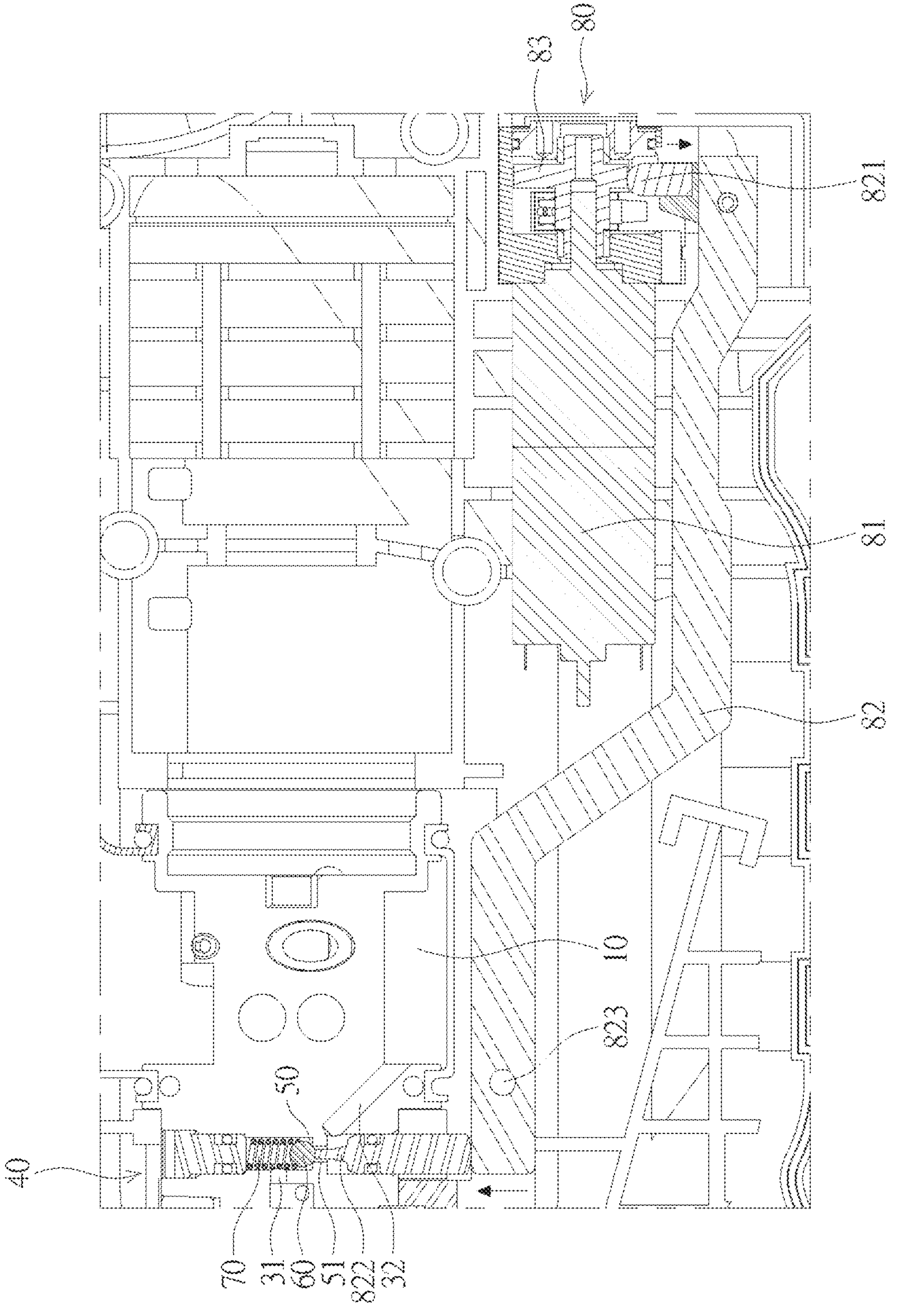
FIG. 3 is an enlarged sectional view of the hydraulic hand tool in FIG. 1.
Figure 4:
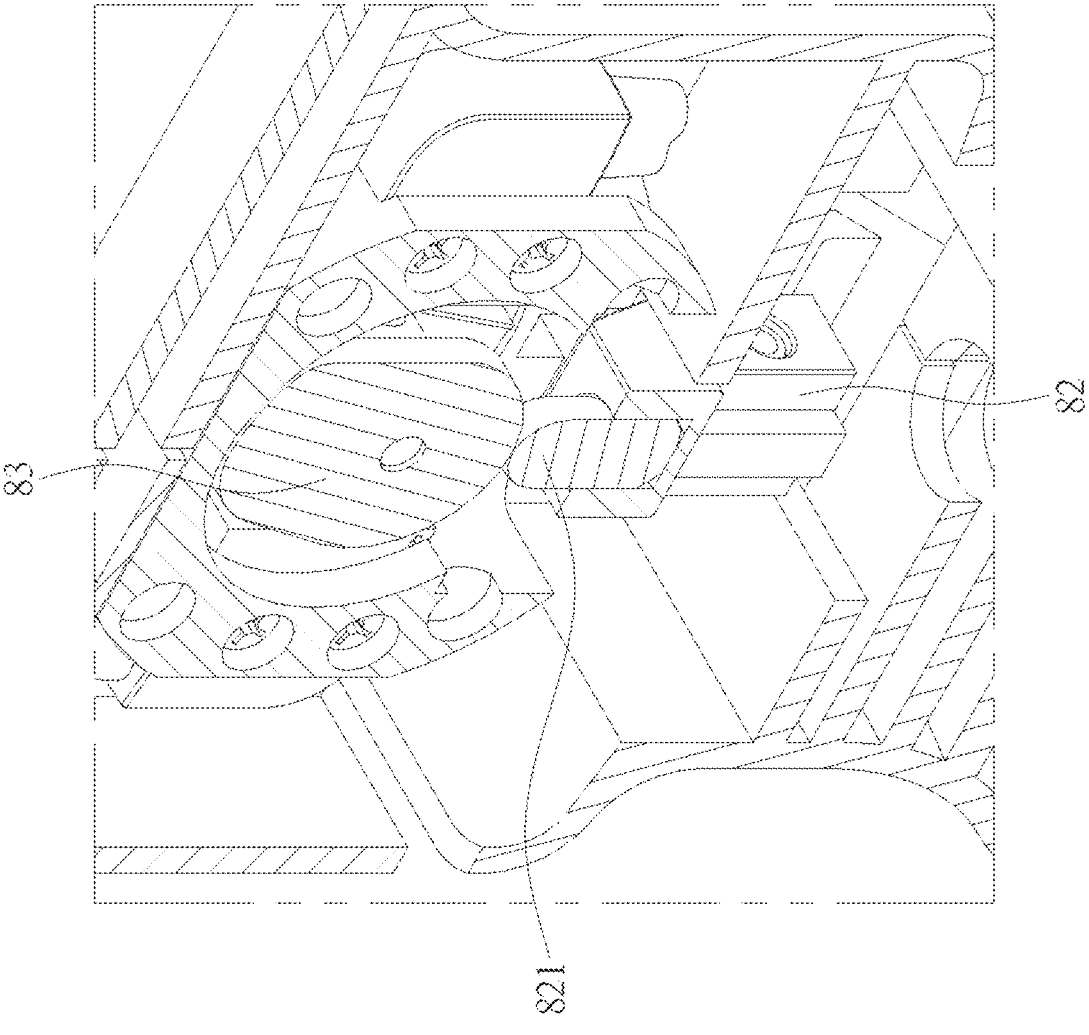
FIG. 4 is another enlarged sectional view of the hydraulic hand tool in FIG. 1.

With reference to FIG. 1 to FIG. 4, a hydraulic hand tool in accordance with the present invention is configured to contain hydraulic oil inside. The hydraulic oil moves through the pipeline inside the hydraulic hand tool, allowing the hydraulic hand tool to clamp or squeeze objects. The hydraulic hand tool comprises a first oil-storage space 10, a piston assembly 20, a first oil-return channel 31, a second oil-return channel 32 and an oil-return-controlling mechanism 40.

The inside of the first oil-storage space 10 can accommodate hydraulic oil. The piston assembly 20 comprises a piston 21, a second oil-storage space 22, and an oil-inlet channel 23. The second oil-storage space 22 is mounted in the piston 21. The second oil-storage space 22 is mounted apart from the first oil-storage space 10. The oil-inlet channel 23 communicates with the first oil-storage space 10 and the second oil-storage space 22, allowing the hydraulic oil to flow into the second oil-storage space 22 from the first oil-storage space 10 through the oil-inlet channel 23 and push the piston 21. The first oil-return channel 31 communicates with the second oil-storage space 22, and the second oil-return channel 32 communicates with the first oil-return channel 31 and the first oil-storage space 10. In other words, the first oil-return channel 31 and the second oil-return channel 32 communicate with the second oil-storage space 22 and the first oil-storage space 10. The hydraulic oil can flow into first oil-storage space 10 from the second oil-storage space 22 through the first oil-return channel 31 and the second oil-return channel 32 sequentially.

The oil-return-controlling mechanism 40 can communicate with or block the first oil-return channel 31 and the second oil-return channel 32. The oil-return-controlling mechanism 40 can comprise a control channel 50, a blocking unit 60, an elastic unit 70, a driving assembly 80, and a control module (not shown in the figure). The control channel 50 communicates with the first oil-return channel 31 and the second oil-return channel 32. The blocking unit 60 is mounted in the control channel 50 and can selectively block the control channel 50, thereby blocking or communicating between the first oil-return channel 31 and the second oil-return channel 32. The elastic unit 70 presses against the blocking unit 60. In the first embodiment, the elastic unit 70 tends to press the blocking unit 60 toward the second oil-return channel 32 such that the blocking unit 60 blocks the first oil-return channel 31 and the second oil-return channel 32. Precisely, there is a constriction section 51 with a narrow diameter in the control channel 50, and the components and the structures are sequentially the elastic unit 70, the blocking unit 60, the constriction section 51, and the second oil-return channel 32. Therefore, when the elastic unit 70 presses the blocking unit 60 toward the second oil-return channel 32, the blocking unit 60 abuts against the constriction section 51 to block the control channel 50.

The driving assembly 80 is connected to the blocking unit 60 and can make the blocking unit 60 move against the elastic unit 70, and then communicate with the first oil-return channel 31 and the second oil-return channel 32. The driving assembly 80 comprises a motor 81 and a linkage mechanism 82. The motor 81 comprises a cam 83. The cam 83 is mounted on a shaft of the motor 81 and can rotate with the shaft. The linkage mechanism 82 comprises a first end 821, a second end 822, and a fulcrum 823. The first end 821 is selectively connected to the cam 83 of the motor 81, and the second end 822 is connected to the blocking unit 60. The motor 81 drives the cam 83 to drive the first end 821 of the linkage mechanism 82, and the second end 822 of the linkage mechanism 82 drives the blocking unit 60 against the elastic unit 70. Then the blocking unit 60 is moved away from the second oil-return channel 32 to open the constriction section 51, thereby the first oil-return channel 31 and the second oil-return channel 32 communicating with each other. In this embodiment, the fulcrum 823 is between the first end 821 and the second end 822, and a distance from the fulcrum 823 to the first end 821 is greater than a distance from the fulcrum 823 to the second end 822. Therefore, through the linkage mechanism 82, a force exerted by the cam 83 due to the motor 81 is greater than a force exerted by the blocking unit 60.

The control module can be a processor and is signally connected to the driving assembly 80. The control module can control the angle and time of the rotation of the cam 83, thereby controlling the blocking unit 60 to communicate between or block the first oil-return channel 31 and the second oil-return channel 32. When the user presses the oil-return button (not shown in the figure), the control module activates the driving assembly 80 such that the first oil-return channel 31 and the second oil-return channel 32 communicate with each other.

When the hydraulic oil flows into the second oil-storage space 22 from the first oil-storage space 10 through the oil-inlet channel 23, a pressure in the second oil-storage space 22 increases and the piston 21 is pushed, such that the hydraulic hand tool can clamp or squeeze objects. When the hydraulic hand tool completes clamping or squeezing, the control module controls the motor 81 of the driving assembly 80 for a preset time period. Precisely, when the user presses the oil-return button, the control module controls the motor 81 of the driving assembly 80, and the motor 81 rotates the cam 83 until the cam 83 abuts and drives the first end 821 of the linkage mechanism 82. When the preset time period ends, the motor 81 rotates the cam 83 until the cam 83 is away from the linkage mechanism 82.

When the cam 83 drives the first end 821 of the linkage mechanism 82, the second end 822 of the linkage mechanism 82 drives the blocking unit 60 to move against the elastic unit 70. Therefore, the blocking unit 60 moves away from the second oil-return channel 32 for the preset time period to open the constriction section 51 such that the first oil-return channel 31 and the second oil-return channel 32 communicate with each other. When the hydraulic oil flows into the first oil-storage space 10 from the second oil-storage space 22 through the first oil-return channel 31 and the second oil-return channel 32, the pressure in the second oil-storage space 22 is reduced and the piston 21 is returned to its original position, allowing the hydraulic hand tool to release the object. When the cam 83 rotates away from the linkage mechanism 82, the blocking unit 60 loses the force against the elastic unit 70, and the elastic unit 70 pushes and moves the blocking unit 60 to block the first oil-return channel 31 and the second oil-return channel 32. The user can set the preset time period for the cam 83 to drive the linkage mechanism 82, thereby controlling the amount of the returning hydraulic oil, and thereby controlling to what extend the hydraulic hand tool releases the object.

Figure 5:
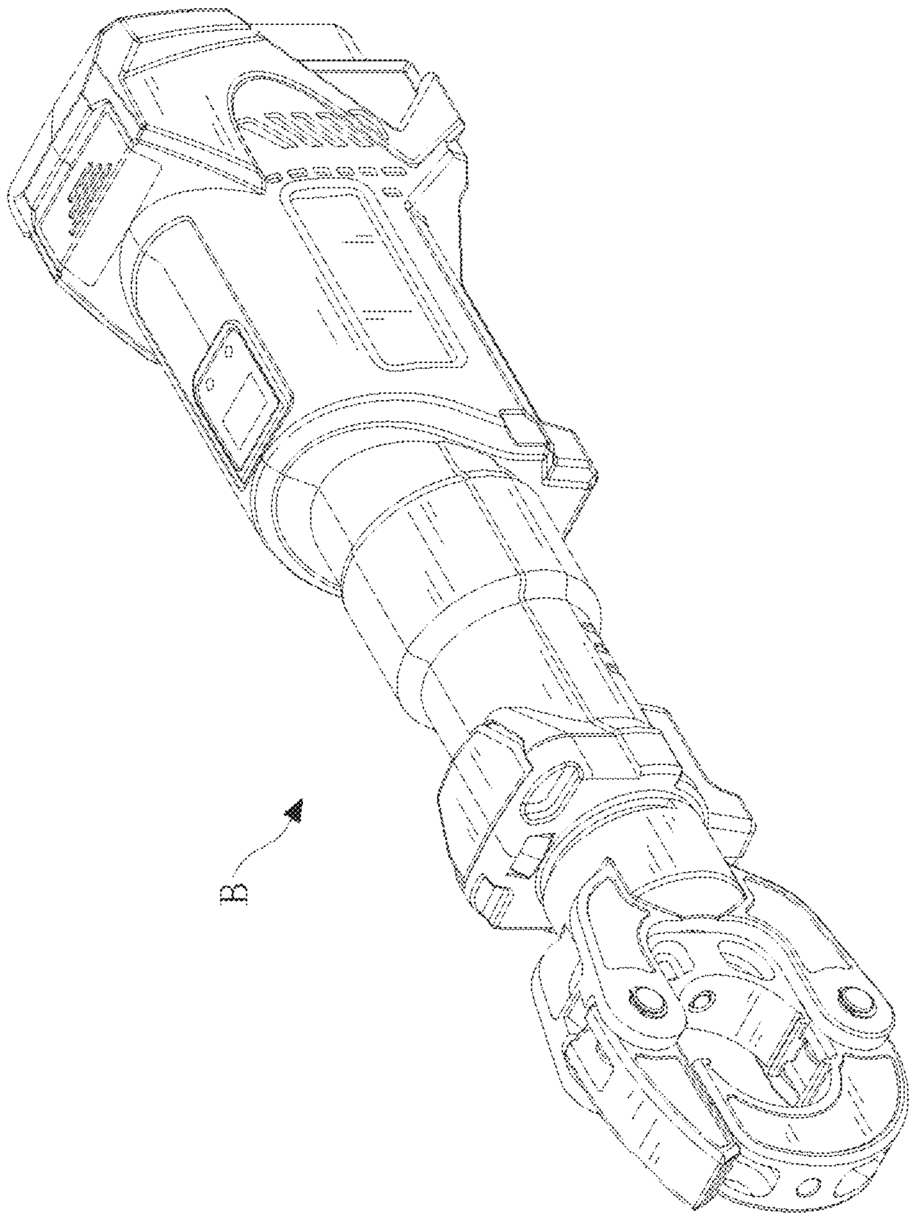
FIG. 5 is a perspective view of a hydraulic hand tool of the second embodiment in accordance with the present invention.
Figure 6:
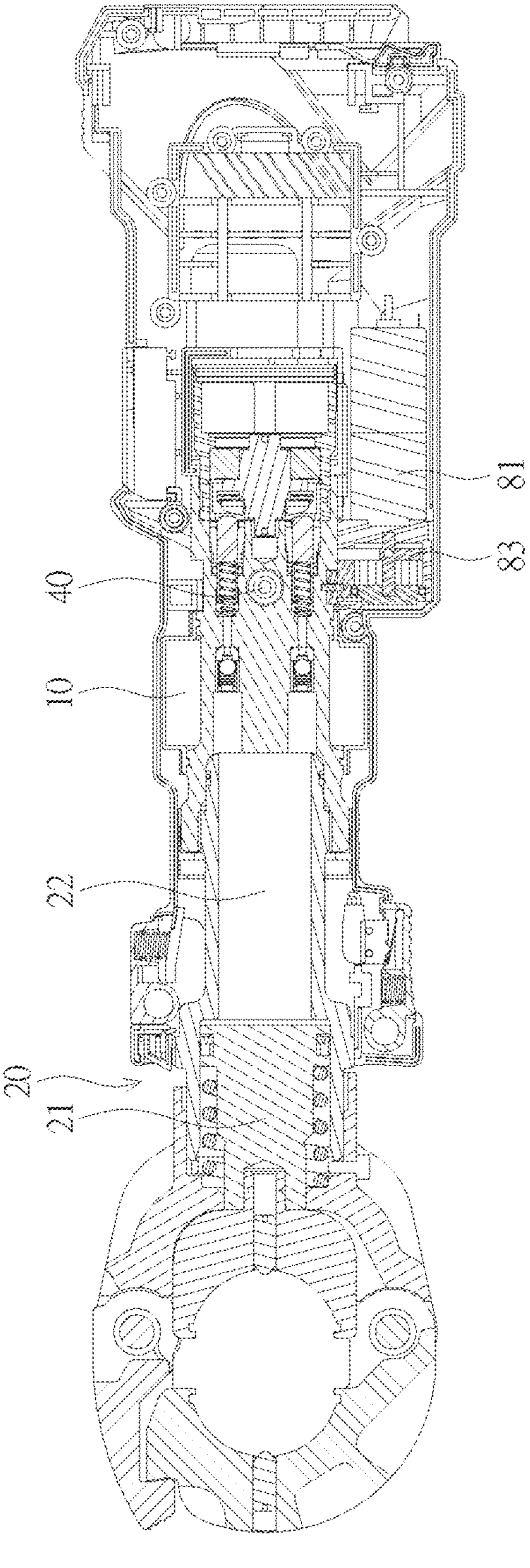
FIG. 6 is a sectional view of the hydraulic hand tool in FIG. 5.
Figure 7:
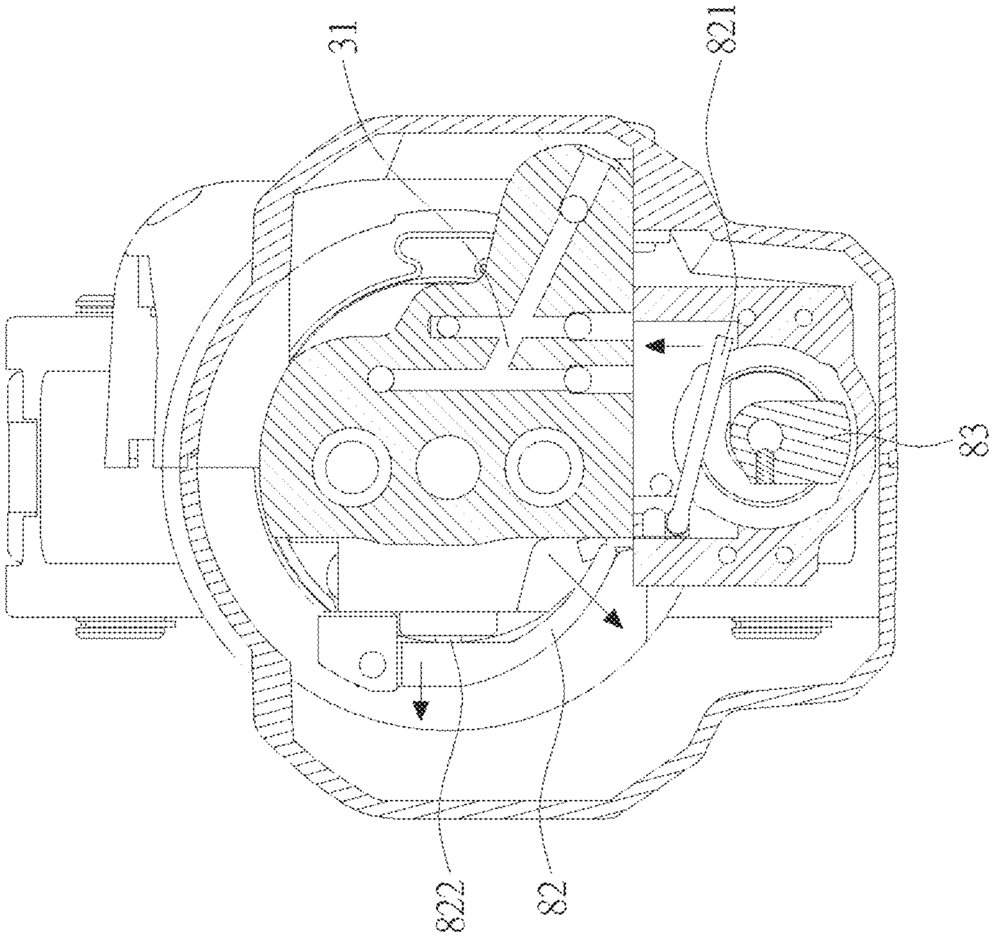
FIG. 7 is another sectional view of the hydraulic hand tool in FIG. 5.
Figure 8:
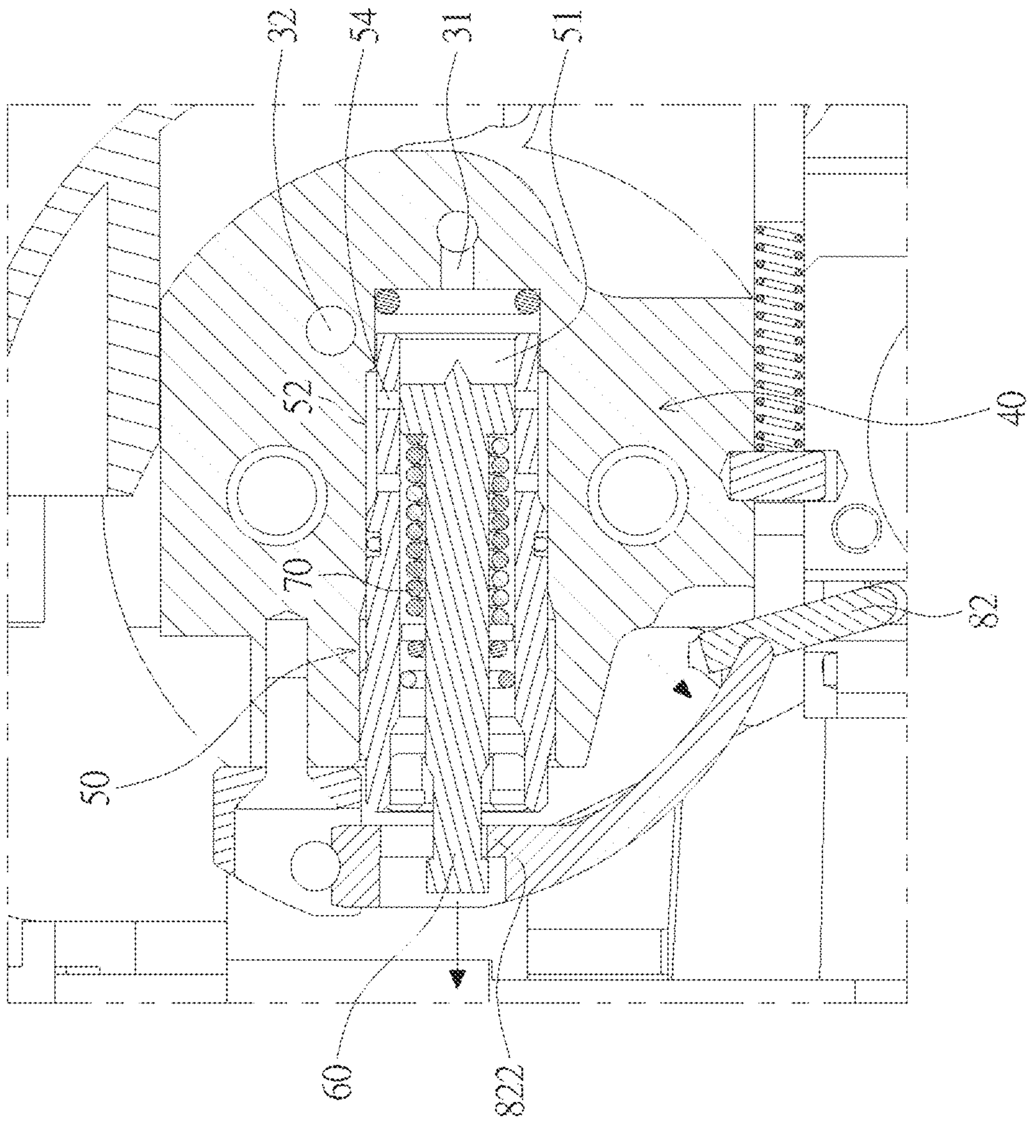
FIG. 8 is an enlarged sectional view of the hydraulic hand tool in FIG. 5.
Figure 9:
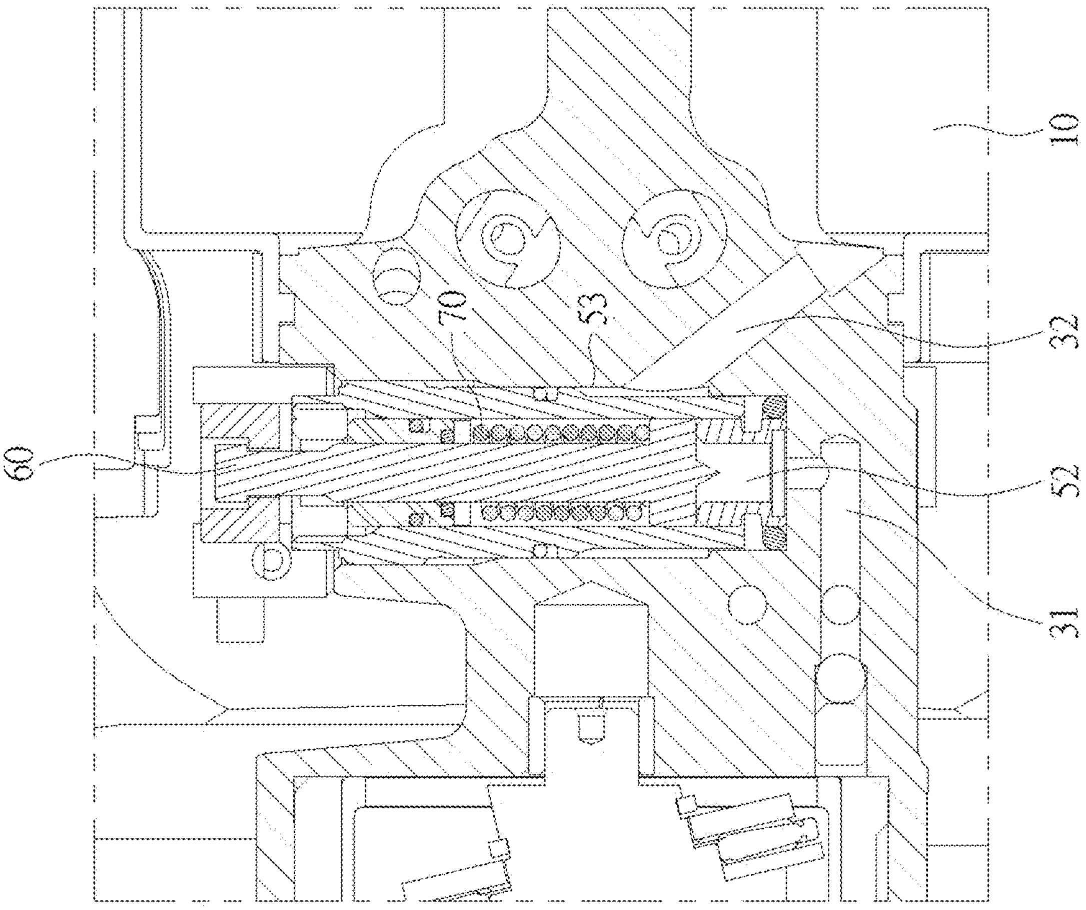
FIG. 9 is another enlarged sectional view of the hydraulic hand tool in FIG. 5.

With reference to FIG. 5 to FIG. 9, the hydraulic hand tool in the second embodiment is similar to the hydraulic hand tool in the first embodiment. The difference is that the control channel 50 further comprises a first channel 52, a second channel 53, and multiple holes 54. The first channel 52 is mounted through the second channel 53, and there is a gap between the first channel 52 and the second channel 53. An end of the first channel 52 communicates with the first oil-return channel 31, and the second channel 53 communicates with the second oil-return channel 32. Precisely, the second oil-return channel 32 is said gap between and communicating with the first channel 52 and the second channel 53. The holes 54 are formed on a wall of the first channel 52 and communicate with the inside of the first channel 52 and the gap between the first channel 52 and the second channel 53. The blocking unit 60 is mounted in the first channel 52 and is fitted with an inner wall of the first channel 52. The elastic unit 70 tends to press the blocking unit 60 to a location between the first oil-return channel 31 and the holes 54 to block the first oil-return channel 31 and the holes 54, and also blocks the first oil-return channel 31 and the second oil-return channel 32 in the second embodiment. When the motor 81 drives the cam 83 to drive the first end 821 of the linkage mechanism 82, the second end 822 of the linkage mechanism 82 drives the blocking unit 60 against the elastic unit 70. Then the blocking unit 60 is moved away from the first oil-return channel 31 such that the first oil-return channel 31 and the holes 54 communicate with each other, thereby allowing the hydraulic oil to flow into the second oil-return channel 32 from the first oil-return channel 31 through the first channel 52, the holes 54 and the second channel 53 sequentially.

The advantage of the present invention is that the startup and shutdown of the oil-return process are started through the control module settings and the driving assembly 80. The user only needs to press the oil-return button once and then start the control module. The driving assembly 80 is controlled by the control module to perform the oil-return operation for a preset time. When the operation set by the user is completed, the control module controls the driving assembly 80 to rotate the cam 83 away from the linkage mechanism 82. Therefore, the blocking unit 60 loses the force against the elastic unit 70, allowing the elastic unit 70 to press against the blocking unit 60 and move the blocking unit 60 to block the first oil-return channel 31 and the second oil-return channel 32. In other words, the user does not need to continuously manually control the oil-return process. The user only needs to set the control module in advance to easily operate the hydraulic hand tool and fix the amount of oil return for each oil-return process.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hydraulic hand tool comprising:

a first oil-storage space configured to contain hydraulic oil inside;

a piston assembly mounted apart from the first oil-storage space and comprising:

an oil-inlet channel communicating with the first oil-storage space;

a second oil-storage space communicating with the oil-inlet channel; the hydraulic oil capable of flowing into the second oil-storage space from the first oil-storage space through the oil-inlet channel;

a first oil-return channel communicating with the second oil-storage space; the hydraulic oil capable of flowing into the first oil-return channel from the second oil-storage space;

a second oil-return channel communicating with the first oil-return channel and the first oil-storage space; the hydraulic oil capable of flowing into the first oil-storage space from the first oil-return channel through the second oil-return channel;

an oil-return-controlling mechanism selectively communicating between or blocking the first oil-return channel and the second oil-return channel; the oil-return-controlling mechanism comprising:

a control channel communicating with the first oil-return channel and the second oil-return channel;

a blocking unit mounted in the control channel and selectively communicating between or blocking the first oil-return channel and the second oil-return channel;

an elastic unit pressing against the blocking unit such that the blocking unit blocks the first oil-return channel and the second oil-return channel; the elastic unit tending to press the blocking unit toward the second oil-return channel;

a driving assembly connected to the blocking unit; the driving assembly making the blocking unit resist the elastic unit such that the first oil-return channel and the second oil-return channel communicate with each other; the driving assembly comprising:

a motor;

a linkage mechanism comprising a first end and a second end; the first end connected to the motor and the second end connected to the blocking unit; the motor driving the linkage mechanism and making the linkage mechanism drive the blocking unit to resist the elastic unit and away from the second oil-return channel, thereby the first oil-return channel and the second oil-return channel communicating with each other;

a control module signally connected to the driving assembly and making the driving assembly resist the elastic unit in a preset time period.

2. The hydraulic hand tool as claimed in claim 1, wherein the linkage mechanism comprises:

a fulcrum; a distance from the fulcrum to the first end being bigger than a distance from the fulcrum to the second end.

3. The hydraulic hand tool as claimed in claim 2, wherein:

the motor comprises:

a cam; the first end of the linkage mechanism selectively connected to the cam, thereby the cam selectively driving the first end of the linkage mechanism;

when the cam drives the first end of the linkage mechanism, the second end of the linkage mechanism drives the blocking unit.

4. The hydraulic hand tool as claimed in claim 1, wherein:

the motor comprises:

a cam; the first end of the linkage mechanism selectively connected to the cam, thereby the cam selectively driving the first end of the linkage mechanism;

when the cam drives the first end of the linkage mechanism, the second end of the linkage mechanism drives the blocking unit.

5. A hydraulic hand tool, comprising:

a first oil-storage space configured to contain hydraulic oil inside;

a piston assembly mounted apart from the first oil-storage space and comprising:

an oil-inlet channel communicating with the first oil-storage space;

a second oil-storage space communicating with the oil-inlet channel; the hydraulic oil capable of flowing into the second oil-storage space from the first oil-storage space through the oil-inlet channel;

a first oil-return channel communicating with the second oil-storage space; the hydraulic oil capable of flowing into the first oil-return channel from the second oil-storage space;

a second oil-return channel communicating with the first oil-return channel and the first oil-storage space; the hydraulic oil capable of flowing into the first oil-storage space from the first oil-return channel through the second oil-return channel;

an oil-return-controlling mechanism selectively communicating between or blocking the first oil-return channel and the second oil-return channel; the oil-return-controlling mechanism comprising:

a control channel communicating with the first oil-return channel and the second oil-return channel;

a blocking unit mounted in the control channel and selectively communicating between or blocking the first oil-return channel and the second oil-return channel;

an elastic unit pressing against the blocking unit such that the blocking unit blocks the first oil-return channel and the second oil-return channel; the elastic unit tending to press the blocking unit toward the first oil-return channel;

a driving assembly connected to the blocking unit; the driving assembly making the blocking unit resist the elastic unit such that the first oil-return channel and the second oil-return channel communicate with each other; the driving assembly comprises:

a motor;

a linkage mechanism comprising a first end and a second end; the first end connected to the motor and the second end connected to the blocking unit; the motor driving the linkage mechanism and making the linkage mechanism drive the blocking unit to resist the elastic unit and away from the first oil-return channel, thereby the first oil-return channel and the second oil-return channel communicating with each other;

a control module signally connected to the driving assembly and making the driving assembly resist the elastic unit in a preset time period.

6. The hydraulic hand tool as claimed in claim 5, wherein:

the control channel comprises:

multiple holes formed on a wall of the control channel and communicating with the first oil-return channel and the second oil-return channel;

the elastic unit tends to press the blocking unit to a location between the first oil-return channel and the holes and block the first oil-return channel and the holes;

the linkage mechanism drives the blocking unit and makes the blocking unit resist the elastic unit and leave the location between the first oil-return channel and the holes, thereby the first oil-return channel and the second oil-return channel communicating with each other.

7. The hydraulic hand tool as claimed in claim 6, wherein the control channel comprises:

a first channel communicating with the first oil-return channel; the holes formed on the wall of the first channel; the blocking unit mounted in the first channel;

a second channel communicating with the second oil-return channel and sleeved on the first channel.

8. The hydraulic hand tool as claimed in claim 7, wherein:

the motor comprises:

a cam; the first end of the linkage mechanism selectively connected to the cam, thereby the cam selectively driving the first end of the linkage mechanism;

when the cam drives the first end of the linkage mechanism, the second end of the linkage mechanism drives the blocking unit.

9. The hydraulic hand tool as claimed in claim 5, wherein:

the motor comprises:

a cam; the first end of the linkage mechanism selectively connected to the cam, thereby the cam selectively driving the first end of the linkage mechanism;

when the cam drives the first end of the linkage mechanism, the second end of the linkage mechanism drives the blocking unit.

* * * * *